2 Sheets—Sheet 1.
S. E. AMENT.
Revolving Rake.
No. 2,710. Reissued Aug. 6, 1867.
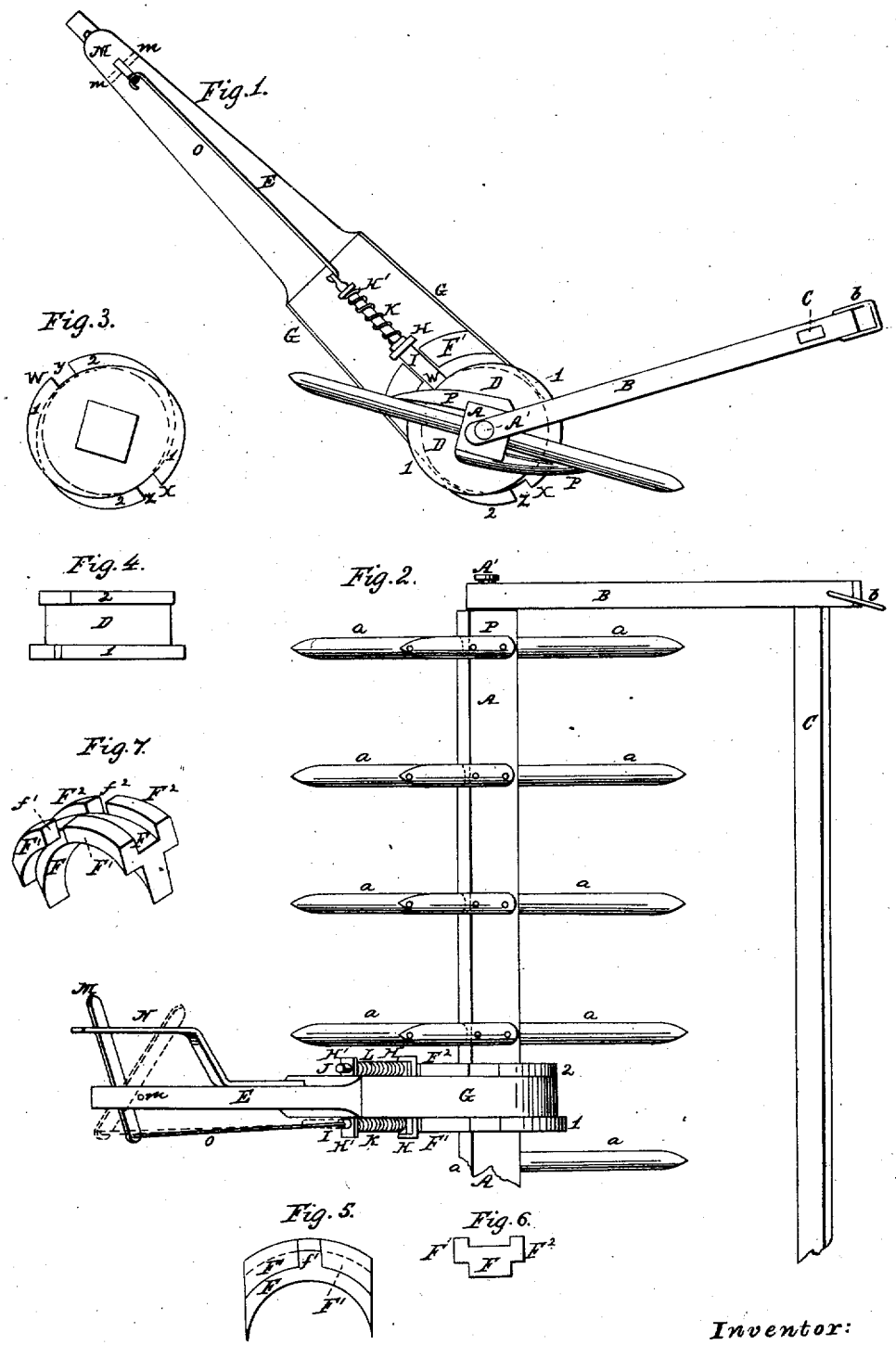
Witnesses:
D. N. Stetson
A. H. Hendrickson
Inventor:
Sylvester E. Ament
N. PETERS, Photo-Lithographer, Washington, D. C.

2 Sheets—Sheet 2.

S. E. AMENT.

Revolving Rake.

No. 2,710. Reissued Aug. 6, 1867.

Witnesses:
D. W. Stetson
W. A. Hendrickson.

Inventor:
Sylvester E. Ament

N. PETERS, Photo-Lithographer, Washington, D. C.

United States Patent Office

SYLVESTER E. AMENT, OF OSWEGO, ILLINOIS.

*Letters Patent No.* 41,469, *dated February* 9, 1864; *reissue No.* 1,732, *dated July* 26, 1864; *reissue No.* 2,710, *dated August* 6, 1867

IMPROVEMENT IN HORSE-RAKES.

The Schedule referred to in these Letters Patent and making part of the same.

TO ALL WHOM IT MAY CONCERN:

Be it known that I, SYLVESTER E. AMENT, of Oswego, in the county of Kendall, in the State of Illinois, have invented certain new and useful improvements in Revolving Rakes; and I do hereby declare that the following is a full and exact description thereof, reference being had to the accompanying drawings, and to the letters of reference marked thereon.

My improvements relate to rakes which slide upon the earth, with the teeth bearing very nearly a horizontal position thereto, and adapted to discharge the hay at the will of the operator by a half revolution of the revolving parts.

To enable others skilled in the art to make and use my invention, I will proceed to describe its construction and operation by the aid of the drawings and of the letters of reference marked thereon.

The plan view of sheet 2 in the drawings of the rake does not represent the revolving shaft at its full length, nor consequently the whole number of teeth usually employed; but when the said shaft is shown at its full length it contains six more teeth, fourteen in all, with the spaces between them, and between the outside teeth and the draw-bars, the same as represented. With this exception the representation of the rake, as here given, is supposed to be perfectly proportionate to the original machine. The scale upon which figs. 1 and 2 of sheet 2 are drawn, is one-twelfth of an inch to the inch; that of figs. 3, 4, 5, and 6, of same sheet, is one-fourth of an inch to the inch.

In sheet 1—

Figure 1 is a side elevation, and

Figure 2 a partial plan view of the machine, both having the several parts applied together for use.

Figure 3 is a side view, and

Figure 4 a plan view of a portion of the machine detached.

Figure 5 is a side view.

Figure 6, a central cross-section, and

Figure 7 a perspective view of another portion detached.

In sheet 2—

Figure 1 is a plan view, and

Figure 2 a side elevation of the machine with the parts applied together for use, except, however, that there is a cross-section, in fig. 2, of the revolving shaft A and of the cross-rail C, as represented, in order that the locking devices may be more plainly exhibited.

Similar letters of reference indicate like parts in all the figures; but in the following description reference is had more particularly to the figures of sheet No. 2, the form or modification therein shown being such as is believed to be the best adapted to practical use.

Figure 1:
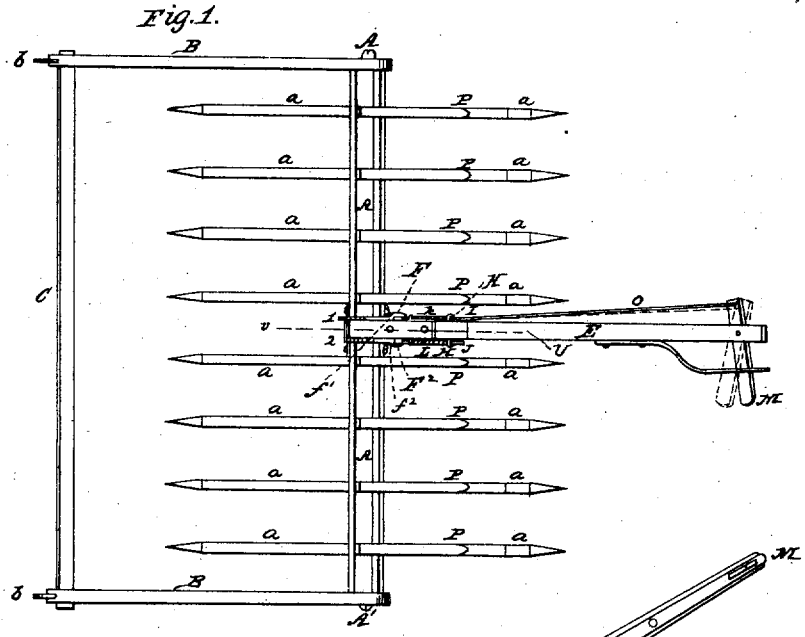
Figure 2:
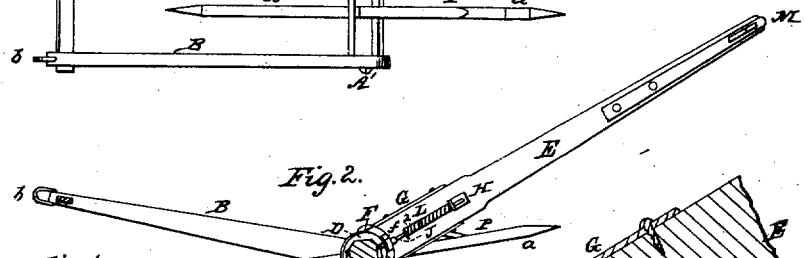
Figure 4:
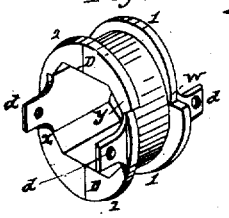
Figure 4 is a perspective view of a part of the machine detached therefrom, and which may be designated as the metallic bearing-girdle.
Figure 3:
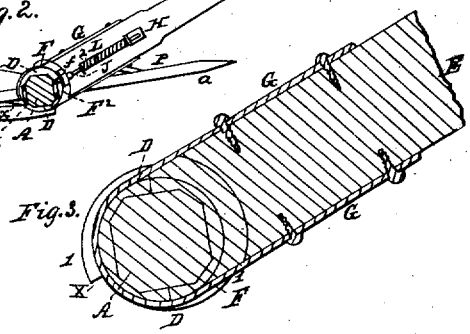
Figure 3 is a vertical section of a central portion of the machine on the line *v v* in fig. 1.
Figure 5:
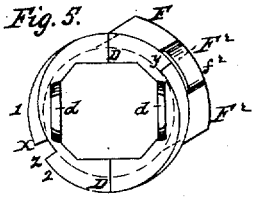
Figure 5 is a side elevation of the said metallic bearing-girdle, and also of another portion of the machine distinguishable as the metallic saddle.
Figure 6:
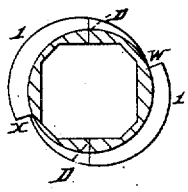
Figure 6 is a transverse section of the said metallic bearing-girdle, on the line *v v* in fig. 1.

A is the revolving shaft, with the teeth *a a* fixed therein. The bearings A′ A′ at the ends of A, in the form of screw-bolts, are carried in draw-bars B B, which draw-bars B B are united at their forward ends by the cross-rail C, as represented. The cross-rail or bar C prevents the forward ends of B B from collapsing or falling towards each other when the necessary draught is applied to them to draw the machine. The forward ends of B B are provided also with a couple of clevises, *b b*, from which to extend a couple of trace-chains to meet the ends of the tugs. P P are two series of straps or braces of wood, by which each one of the teeth is braced and strengthened, and prevented thereby from springing out of its proper range. In rakes of this kind it is very important that no tooth become bent or warped so as to stand out of the plane of its fellows. The said braces have the form and arrangement represented, and are secured directly to A and *a a* by means of screws, or their equivalents, and are used upon each tooth in the series for the purpose of keeping the points thereof in perfect range. The metallic bearing-girdle D is formed of two halves, and fixed upon the middle of the shaft A by means of lugs *d d* and a couple of bolts, as shown, figs. 1, 2, 4, and 5, and is formed also with a cylindrical bearing, D′, upon it, and with a flange, 1, upon the right-hand side, and a flange, 2, upon the left-hand side, as represented. The handle E is by means of a peculiar casting, F, and strap, G, fitted upon the cylindrical bearing D′ in such a manner as to allow the said bearing with the parts upon which it is fixed to revolve freely, except when it is prevented by other means. The peripheries of the flanges 1 and 2 are not circular, but are each armed with two eccentric projections, as represented. Each projection has one face, standing radial or nearly so, to the axis of the shaft A. The other face of each projection is sloped away nearly to the perpendicular face of the next projection, so as to give the exterior of each flange a form described very nearly by two arcs of a volute curve or spiral; but there will be observed a very marked difference in the flanges 1 and 2. The perpendicular faces W X on the flange 1 are adapted to meet a suitable stop to prevent the rake from rotating in one direction, while the faces Y Z on the flange 2 are adapted to meet a similar stop to prevent the rake from rotating in the other or opposite direction. The casting F and additional guides H H on the sides of the handle E carry stout bolts, I and J, each capable of sufficient end motion to meet or avoid the faces described. The said casting, or, in other words, metallic saddle F, forms a sort of facing to the concaved end of the handle E, and affords thereto perfect defence from any contact or friction with the cylindrical bearing D′, and flanges 1 and 2. The thick flanges or side cheeks $F^1$ $F^2$ upon the sides of F enclose or embrace the end of E between them. The bolts I and J are carried in deep rectangular notches or holes, $f^1$ $f^2$, and are thus very strongly guided and supported. The said bolts I and J are not connected together, but operate independently of each other, and are provided with coiled springs K and L, which urge each toward the centre of the shaft A. When both of the bolts I and J, by the tension of their respective springs, press upon the periphery of their respective flanges, the end of the bolt I on the periphery of the flange 1, and the end of the bolt J on the periphery of the flange 2, the rotation of the rake causes the perpendicular face W to be brought against the bolt I, which stops the revolution, and the bolt J at the same instant, by the action of the spring L, drops down the perpendicular face Y on the opposite flange 2. The revolving parts are by this means rigidly confined, without liberty to turn in either direction within the lever E, so long as the parts I and J remain in such position.

The machine is used while the operative parts are thus adjusted, and drawn along, accumulating the hay, until when the attendant wishes to discharge the load by a half revolution of the revolving parts. At this juncture he operates a slight lever, M, throwing it into the position shown by the red lines, which movement of the lever M, through the medium of the connection Q, draws the bolt I entirely out of contact with the face W on the flange 1, and by aid of the bolt J, still in contact with the reversed face Y on the opposite flange 2, he elevates the rake sufficiently to have the points of the forward series of the teeth catch hold of the earth, from which point in its elevation the draught animal draws the rake over, the outer end of the handle E is permitted to be lowered to its usual position again, and the revolving parts thus caused to perform a half revolution, and to leave the hay at the point desired. During this half revolution the operator draws back the lever M, so that the bolt I, under the influence of the spring K, presses again upon the periphery of the flange 1, and as it rotates travels down the inclined or volute surface to meet the next face X, while at the same time the opposite bolt J is by the inclined form of the flange 2 pushed back without offering any considerable resistance; but at the same instant that the bolt I meets either radial or perpendicular face on the flange 1, and causes the revolution to stop, the bolt J drops into contact with one of the corresponding reversed faces on the flange 2, and guards thus against any retrograde movements or turning of the parts in the wrong direction.

It will be observed, again, that the bolts I and J are capable of sufficient end motion to meet or avoid the faces described. The springs K and L urge each toward the centre of the shaft A, and that by the sectional eccentric peripheries of the flanges 1 and 2, and the lever M, are compelled at the proper time and for the proper purpose to recede therefrom, so that between the sectional eccentric peripheries of the flanges 1 and 2 and the lever M on the one hand, and the springs K L on the other, the sliding-bolts I and J are made to reciprocate freely and in a manner sufficiently to meet or avoid the faces W X and Y Z, as described.

Some of the advantages due to certain features of my invention herein described may be enumerated as follows:

First, by reason of the employment of the said metallic bearing-girdle D, the strength of the rake-shaft A is greatly saved, inasmuch as the wood thereof does not now have to be turned off to form a bearing to which to attach the said handle E.

Second, by reason of the use of the said metallic bearing D, the connection of the said handle E to the rake-shaft A is made much stronger, more rigid, more efficient, and more durable.

Third, the said metallic bearing-girdle D furnishes also a more perfect base upon which to erect, form, fix, or, in other words, construct the radial or perpendicular faces W, X, Y, and Z, and against which that part of the locking devices with which the handle E is provided and operated to much greater advantage.

Fourth, by reason of the employment of two locks, as described, E is more rigidly fixed to A when locked, and the attendant enabled to control the rotations of the rake to much more advantage.

Fifth, the construction and operation of the machine as here given obviate the use of any of the teeth of the rake for resistances to the locking devices. The teeth do not now, therefore, suffer any liability of being bent, sprung, or warped, nor of being broken out thereby.

Having now full described my improvements, what I claim as my invention, and desire to secure by Letters Patent, is—

1. I claim the metallic bearing-girdle D, adapted to be fixed upon the shaft A of a revolving rake, A *a a*, substantially as and for the purpose herein set forth.

2. I claim forming the metallic bearing-girdle D of two halves, and applying it to the shaft A by means of lugs and bolts, substantially as and for the purpose herein set forth.

3. I claim the metallic bearing-girdle D, provided with one or more pairs of radial or perpendicular faces, W Y, erected, formed, or fixed therein or upon, substantially as and for the purpose herein set forth.

4. I claim, in combination with a single-handled revolving rake, A *a a* E, (when its locking devices do not depend upon the teeth for resistances, except uniformly upon the whole, through the medium of the shaft A,) the employment of one or more pairs of reversed faces, W Y, arranged within the same cylindrical but separate vertical planes, substantially as and for the purpose herein set forth.

5. I claim, in combination with a single-handled revolving rake, A *a a* E, (when its locking devices do not depend upon the teeth for resistances, except uniformly upon the whole, through the medium of the shaft A,) the employment of one or more pairs of reversed faces, W Y, arranged relative to bolts I and J, or their equivalents, substantially as and for the purpose herein set forth.

6. I claim the employment of the sectional eccentric peripheries of the flanges 1 and 2, arranged relative to bolts I and J, and to one or more pairs of reversed faces, W Y, substantially as and for the purpose herein set forth.

7. I claim, in combination with a single-handled revolving rake, A *a a* E, (when its locking devices do not depend upon the teeth for resistances, except uniformly upon the whole, through the medium of the shaft A,) the employment of two locks, each operating independently of the other, substantially as and for the purpose herein set forth.

8. I claim the metallic bush or saddle F, formed with side cheeks $F^1$ $F^2$, and with notches or holes $f^1$ $f^2$, adapted to serve, in connection with the handle E, and with sliding-bolts I and J, substantially in the manner and for the purpose herein set forth.

9. I claim bracing the two series of teeth by the employment of two series of braces, P P, arranged to form an additional direct connection from the rigid shaft A to the teeth *a a*, substantially as and for the purpose herein set forth.

SYLVESTER E. AMENT.

Witnesses:

D. W. STETSON,

W. A. HENDRICKSON.